June 2, 1931.    H. A. DENMIRE    1,808,710
PROCESS AND APPARATUS FOR COVERING TIRE BEADS
Filed June 19, 1925    4 Sheets-Sheet 1

INVENTOR:
HAROLD A. DENMIRE.
BY
ATTORNEY.

June 2, 1931. H. A. DENMIRE 1,808,710
PROCESS AND APPARATUS FOR COVERING TIRE BEADS
Filed June 19, 1925  4 Sheets-Sheet 4

INVENTOR.
HAROLD A. DENMIRE.
BY
ATTORNEY.

Patented June 2, 1931

1,808,710

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

PROCESS AND APPARATUS FOR COVERING TIRE BEADS

Application filed June 19, 1925. Serial No. 38,228.

The present invention relates to the manufacture of pneumatic tires and particularly to a certain operation in the preparation of the materials for the tire. The operation referred to is that of covering the circular tire beads preparatory to their incorporation in the tire structure.

The beads are made as endless rings and before they are placed in the tire it is usual to cover them with a strip of covering fabric known in the art as a "flipper strip." The "flipper strip," or "flipper," so-called, consists of one or more layers of fabric which are impregnated and coated with rubber and are applied to the inner surface of the bead and folded outwardly, the edges of the fabric being rolled together adhesively, forming a web, which, in the finished tire, lies between layers of the carcass.

In machines and methods previously in use, so far as known to me, the fabric to form the "flipper" or covering strip has been applied to the inner surface of the bead, the margins of the fabric being stretched outwardly. As the circumference at the margin is considerably greater than around the inner periphery of the bead, there is a strong resistance set up by the fabric to the cementing and rolling operation and the web of fabric has a strong tendency to curl over. This makes it difficult to apply the fabric to the bead and after it has been applied the curling action of the fabric makes it extremely difficult to place the bead properly in the tire structure.

One of the chief objects of the invention is to overcome the tendency of the fabric web to curl over, a result which is accomplished by applying the fabric to the inner circumference of the bead with a considerable fullness which is absorbed by the outwardly projecting web so that there is no tension set up within the fabric.

Other objects of the invention are to construct a simple and easily operated machine by means of which a girl may be employed in the operation of covering tire beads. A superior bead and "flipper" is obtained, and the work of the tire builder is materially lessened.

In the drawings hereto attached is shown one embodiment of the invention, but it is obvious that the invention is not limited to exact conformity with the details thereof, but may be varied within the scope of the claims appended hereto.

In the drawings:

Figure 6 is a detail showing the manner of supporting the folding shoes or horn;

Figure 7 is a cross-section of the fabric showing the position of the bead thereon; and Figure 8 is an enlarged fragmentary view of the bead, partially covered.

Figure 1:
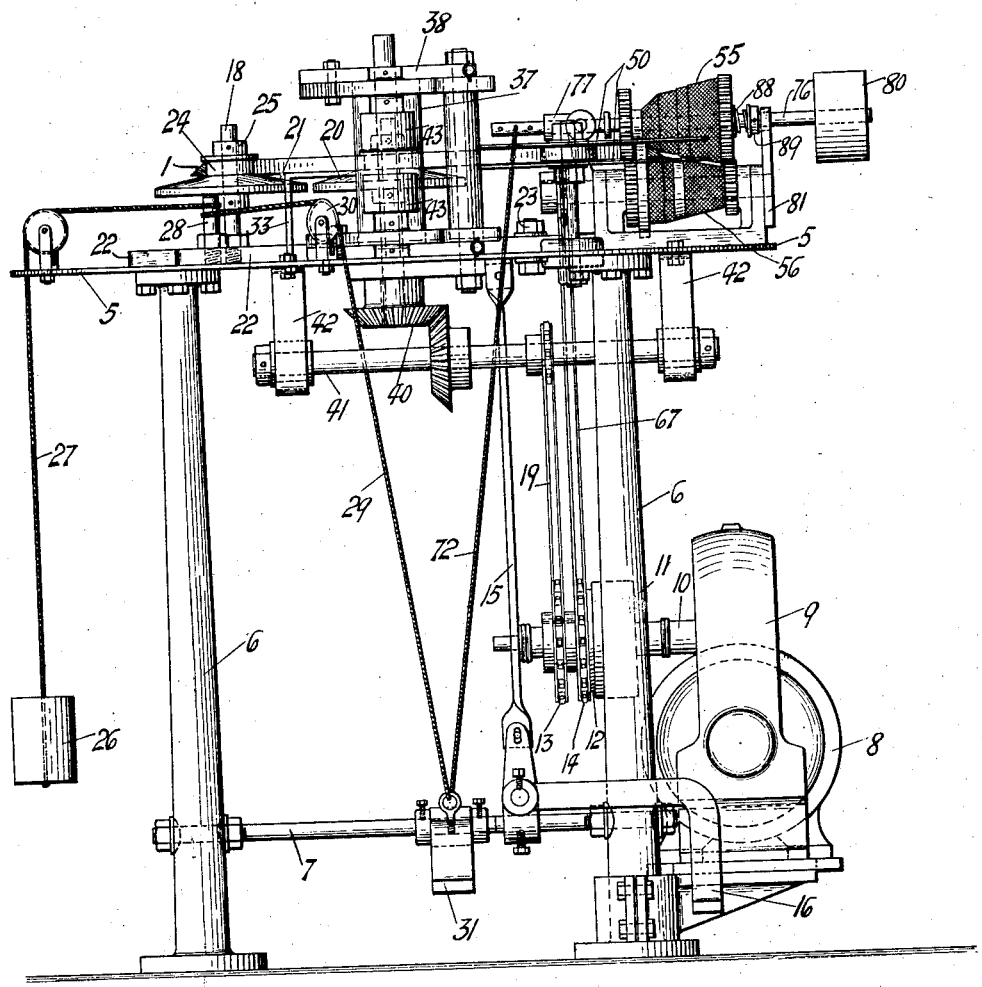
Figure 1 is a side elevation of a machine showing one form of the invention.
Figure 2:
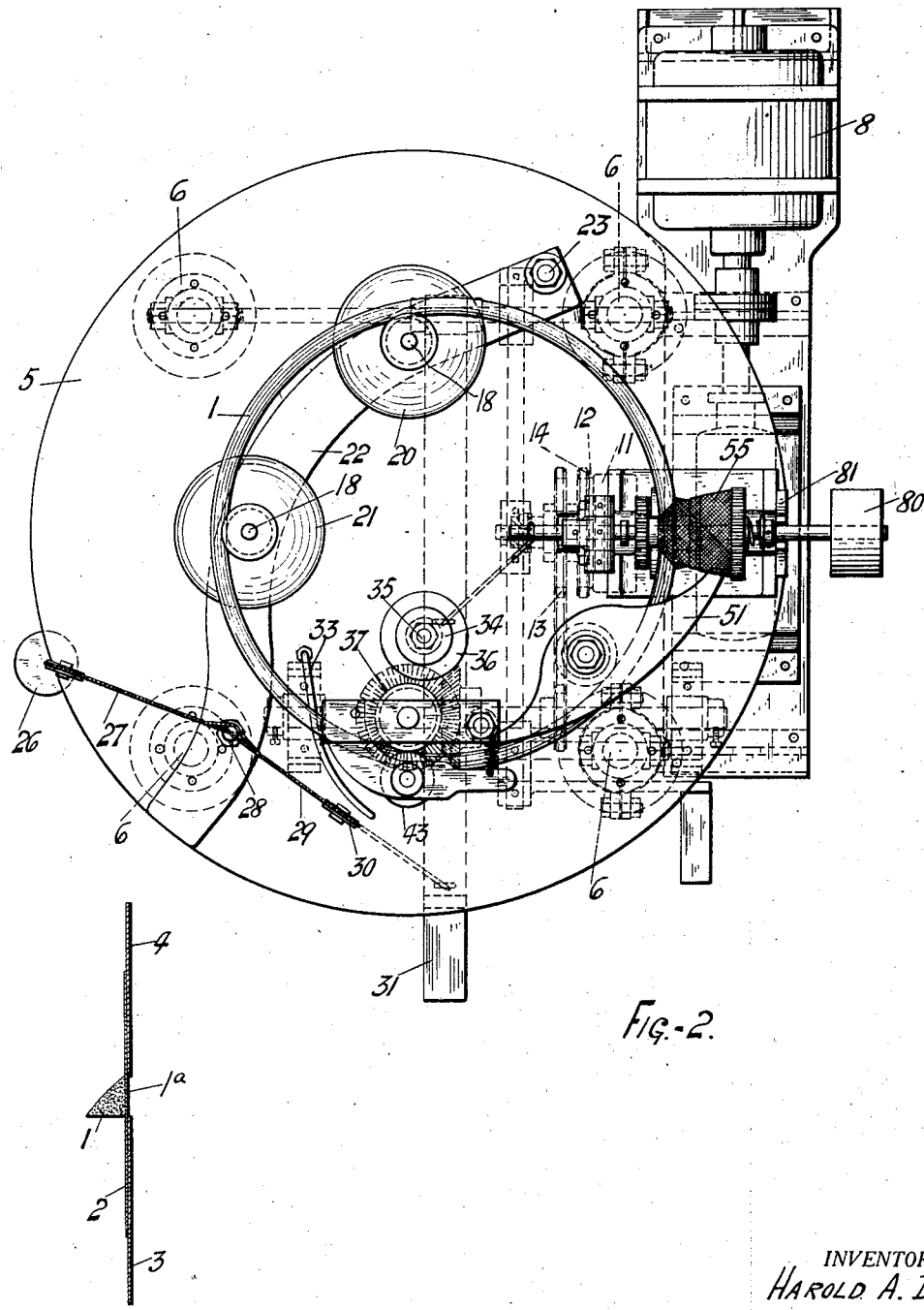
Figure 2 is a plan thereof.

The bead which is designed to be covered and which is in endless or ring form is indicated by the numeral 1. It is usually composed of rubber and metallic reinforcing material, such as wires or cables, and is substantially triangular in cross-section, the inner surface of the bead being indicated by the numeral 1ª. The bead cover, or "flipper," which this machine is intended to apply, may be of various forms such as commonly used by tire manufacturers. In the form illustrated herein, three parallel strips of bias cut fabric are employed, a heavy fabric 2 being placed in the center and two lighter fabrics 3 and 4 on either side thereof and projecting beyond the margins of the central strip. The strips 3 and 4 are designed to terminate at their inner edges at the lower corners of the bead, and the strip 3 is slightly wider than the strip 4. As the bead is located off center with respect to the central strip 2, the outer edges of the superimposed plies of covering material are stepped off. This is shown in Figures 7 and 8. The several strips are all adhesively connected by the usual friction coat of rubber and are prepared for the machine either as a continuous strip or in lengths sufficient to cover a single bead. If the former, the covering strip is severed at the machine by the operator at the proper time.

The machine comprises a table 5 which is supported at the proper height by legs 6, braced as at 7. A motor 8 is supported near the base of the machine and serves to drive the various parts through a worm reduction gearing 9 operating a main drive shaft 10. A positively driven clutch member 11 is carried on the shaft 10 and with this member is designed to cooperate a free clutch member 12 which is provided with sprockets 13 and 14. A link 15 pivoted at its upper end to the table 5 and at its lower end to a foot treadle 16 serves to operate the clutch.

The bead is supported in a horizontal position slightly above the table 5 by the several instrumentalities for applying and smoothing the cover, to be described later, and by two wide cone-shaped rollers 20 and 21 which are rotatably mounted on pins 18 upon a pivoted lever 22 which rocks about a pin 23. Each of these rollers consists of the conical portion referred to and a cylindrical portion 24, to fit the inner periphery of the bead, and a collar 25 which holds the bead in the correct horizontal plane. The lever 22 is normally held outward, so that the rollers contact the inner circumference of the bead, by a weight 26 attached to one end of a cable 27 which is fastened at its other end to a pin 28 near the extremity of the lever.

When it is desired to remove a covered bead and replace it by an uncovered bead, the rollers 20 and 21 are moved inwardly by rocking the lever about the pivot 23 which is done by means of a cable 29 which is secured to the pin 28, passes over an idler 30 and is attached to a foot treadle 31 pivoted on the brace 7. When the rollers have been moved inwardly the bead may be lifted out of the machine.

Figure 3:
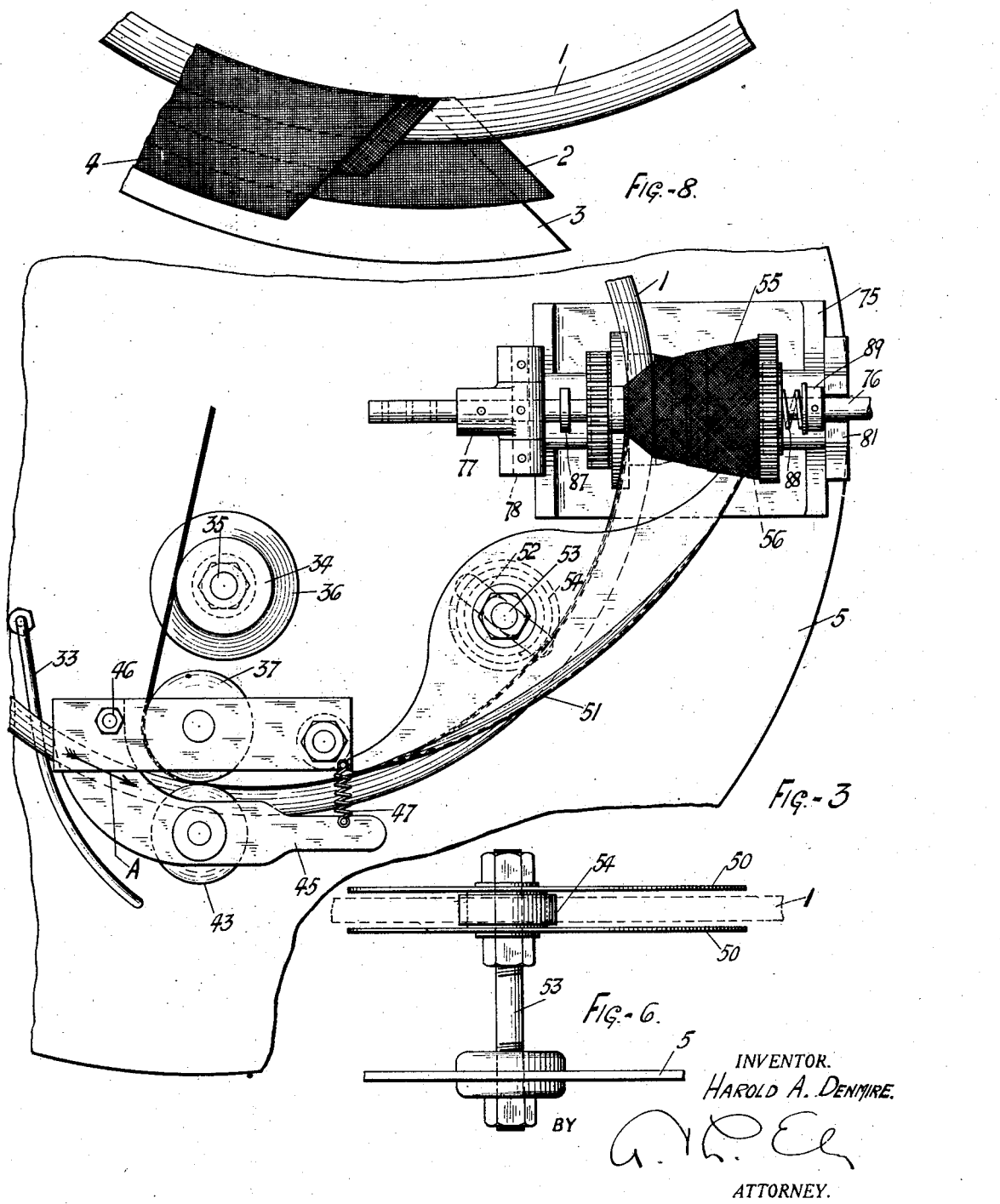
Figure 3 is an enlarged plan at the point of application of the cover to the bead.
Figure 4:
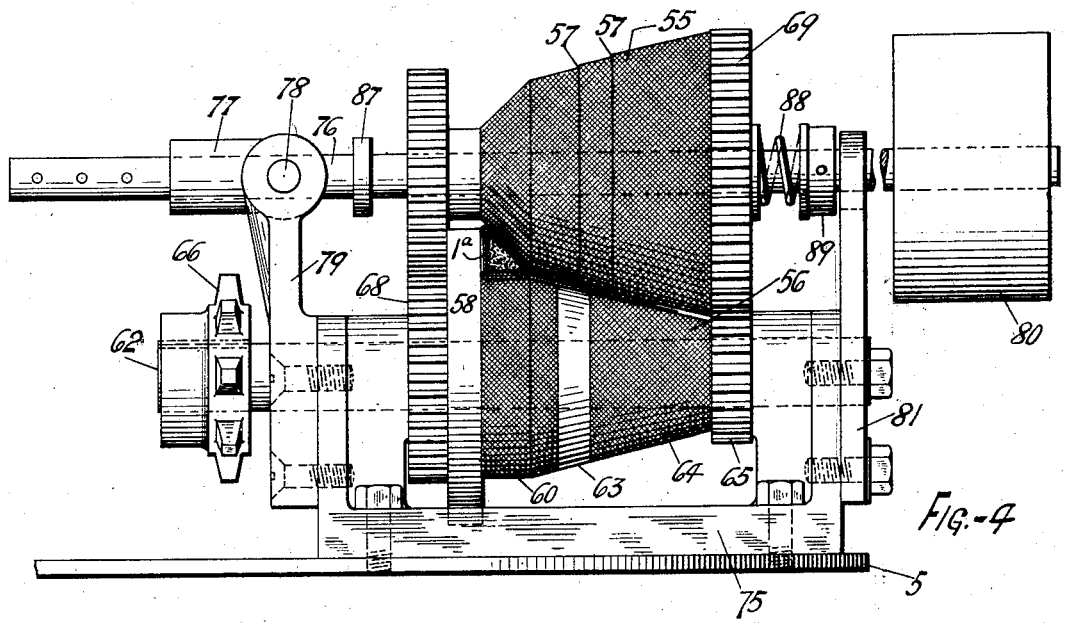
Figure 4 is an enlarged elevation showing the operation of the pressing or smoothing rollers.

The bead is propelled by the smoothing rollers, to be later described, in the direction of the arrow A in Figure 3, and after leaving the roller 21 it first encounters a stationary supporting bracket or guide 33 and then passes to the rolls which apply the compound strip of fabric to the inner periphery of the bead.

The fabric comes from any suitable source and is guided with respect to the bead, so that it is accurately placed in the relation shown in Figure 7. To guide the fabric, use is made of a vertical roller 34 which is rotatably mounted upon a pin 35 in the top of the table 5. A flange 36 is provided on the roller for the lower edge of the fabric and serves to locate the fabric at the proper point with respect to the bead. The fabric passes to the bead about the circumference of a feeding and applying roller 37, which is mounted upon a vertical axis in the parallel arms 38 of a bracket 39. The roller 37 is positively driven by means of bevel gearing 40 from a jack-shaft 41 which is carried in brackets 42 depending from the table 5 and rotated by chain 19 from sprocket 13.

The fabric is held in tight contact with the surface of the roller 37 by means of idle rollers 43—43 which are located above and below the bead and press the margins of the fabric against the roller 37. The rollers 43 are mounted upon stub shafts 44 which extend toward one another from parallel arms 45 each of which is pivoted at 46 to one of the arms 38. Springs 47 hold the rolls 43 against the roll 37 with yielding pressure, so that they may give independently of one another in passing the diagonal splices in the fabric.

Figure 5:
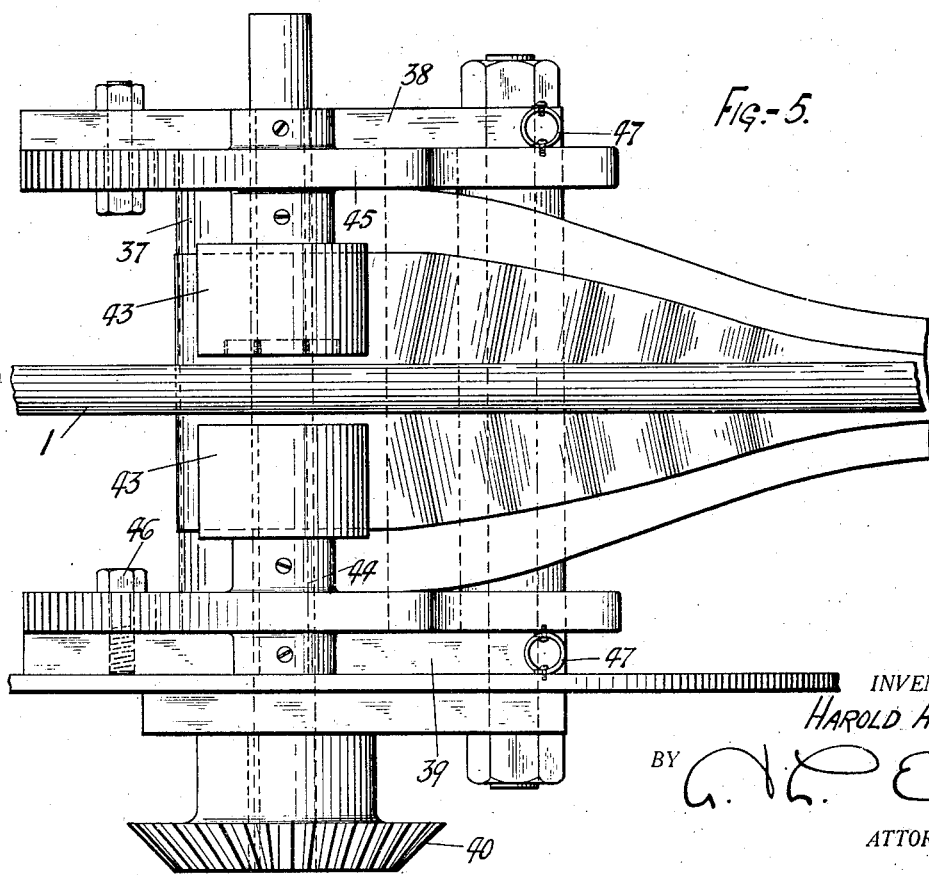
Figure 5 is a similar view of the bending or folding operation.

It will be seen that the amount of the fabric applied to the inner circumference of the bead is dependent upon the surface speed of the roller 37, and the machine is so constituted that the surface speed of the roller 37 is greater than the speed of travel of the bead so that a degree of fullness, determinable by the demands of the work and regulated by the diameter of the roller 37, is imparted to the fabric and distributed evenly throughout the margins of the fabric. This gives a very desirable excess of fabric upon which the machine may draw in folding the fabric outwardly of the bead. The margins of the fabric pucker or fold evenly on either side of the bead, a result intended to be indicated in Figure 5, wherein the fullness is shown. This is one of the valuable features of the present machine and process of covering the bead, and enables the web to be formed from the adhering margins of the fabric with little or no curling of the fabric.

After the bead leaves the fabric applying roller 37, it next encounters devices for turning the margins of the fabric over the bead preparatory to the rolling operation. In the machine as shown, these devices comprise a pair of horns or shoes which diverge outwardly from the inner circumference of the bead and gradually bend the full unapplied margins until they project radially outward of the bead. The shoes are indicated at 50 and are flat plates, the outer edges 51 of which extend in a gradual curve from a point adjacent the applying roller to a point of delivery at the smoothing or compressing rolls. The edges diverge from the line of travel of the bead as shown in Figure 3. The horns are adjustably mounted by means of slots 52 upon an upright post 53 secured to the table, and are arranged on either side of the bead and on either side of a freely rotatable roller 54, located between the horns, against which runs the inner circumference of the bead.

The covering fabric having been applied to the inner circumference of the bead and folded outwardly, the bead is ready for the final rolling and compressing operation which rolls the fabric into adhesive contact with the two side surfaces of the bead and rolls the unapplied margins of the fabric together to form the outwardly projecting web.

This action is performed by two rollers, indicated generally at 55 and 56, placed one above the other, the rollers being substantially conical in form but placed in opposite directions so that the larger surface of one roller is in opposition to the smaller surface of the other. One of the rollers, shown here as the upper roller 55, is stepped off in the manner shown at 57 so as to accommodate the varying thicknesses of the covering fabric and the lower roll 56 is provided with a flange 58 against which bears the inner circumference of the bead. The surfaces of the rollers are knurled or roughened in order to grip the bead firmly, as these rollers serve to drive or propel the bead through the machine.

It will be noted that the outer portion of the bead and its cover are greater in circumference than the inner so that the material travels faster on its outer edge, and this is compensated for by the increased diameter of the roll 55 as it projects outwardly from the bead. The roll 55 is, therefore, solid, while the roll 56 is divided into several sections.

The inner section 60 of the roller 56, together with the flange 58 and the gear 68 are fixedly mounted upon the supporting and driving shaft 2. The intermediate section 63 is loose upon the shaft and the outer section 64 is also loose upon the shaft but is secured to and rotates with a small pinion 65. The shaft 62 is driven by a sprocket 66 and chain 67 from the clutch member 11. The upper roller 55 is driven at the same speed as the section 60 of the roll 56 by equal intermeshing gears 68. The outer end of the roller 55 carries a gear 69 which meshes with the small pinion 65 and drives the section 64 at a higher rate of speed so as to compensate for the difference in circumference of the cover at its outer edge.

The shaft 62 of the lower roller is carried in a bracket 75 secured to the table, while the shaft 76 upon which the upper roller rotates is carried in a bearing 77 which is supported upon a horizontal pivot 78 mounted in a bracket 79 secured to the bracket 75. The shaft 76 is rocked upwardly about the pivot 78 to permit the bead to be removed from the machine by a cable 72 attached to the foot treadle 31 and moved at the same time as the arm 22 is moved. In order to hold the rollers in close contact with the bead to drive it, the outer end of the shaft carries a heavy weight 80, being received within a forked yoke 81 secured to the bracket 75. The roller 55 is mounted so that it is yieldingly held against the bead by a spring 88 located between a collar 89 and the roller, a collar 87 serving as a stop for the inward movement of the roller. In this manner the pressure exerted by the roller 55 is both downwardly and inwardly upon the bead.

The operation of the machine may be briefly summarized as follows:

When the operator depresses the treadle 31, the arm 22 moves inwardly, lifting the weight 26, and the shaft 76 and the roller 55 are elevated. A bead in the machine may then be removed and a new uncovered bead placed therein. The treadle is then released and the bead is held in horizontal position by the rollers 20, 21, 37, 54, 55 and 56. The clutch 12 is then operated by the treadle 16 and the rollers 55 and 56 are rotated, propelling the bead, and at the same time the roller 37 is rotated. The fabric is then introduced between the roller 37 and the inner periphery of the bead and is applied, but due to increase in surface speed of the roller 37, the looseness or fullness is imparted to the fabric as has been explained. The fabric is accurately guided by the roller 36 and is folded outwardly by the horns 50, being finally rolled against the bead and by the rollers 55 and 56.

The bead will be covered with fabric in a manner superior to any known to me heretofore. It operates easily and rapidly and eliminates the objectionable curling tendency of the outstanding web of fabric. The process and machine may be varied from exact conformity to the details which have been described.

What is claimed is:

1. In an apparatus for covering tire beads, a plurality of rollers to support the bead, a support for certain of said rollers which bear against the inner circumference of the bead, and means to move said support toward the center of the bead to permit removal thereof.

2. In an apparatus for covering tire beads, a plurality of rollers to support the bead in a horizontal plane, a pivoted support for certain of said rollers, and means to rock the support toward the center of the bead to permit removal thereof.

3. In an apparatus for covering tire beads, a pair of rollers adapted to roll the fabric into adhesive relation to the bead, one of said rollers being divided, and means to rotate the halves of said roller at different speeds.

4. In an apparatus for covering tire beads, a pair of oppositely positioned conical rollers adapted to receive between them a bead, and an outstanding fabric web, one of said rollers being divided.

5. In an apparatus for covering tire beads, a pair of oppositely positioned conical rollers adapted to receive between them a bead, an outstanding fabric web, one of said rollers being divided, and means to drive the two halves of said roller at different speeds.

HAROLD A. DENMIRE.